Oct. 20, 1936.  J. BEYSCHOWETZ  2,058,053
MOSQUITOPROOF RETREAT
Filed May 7, 1934
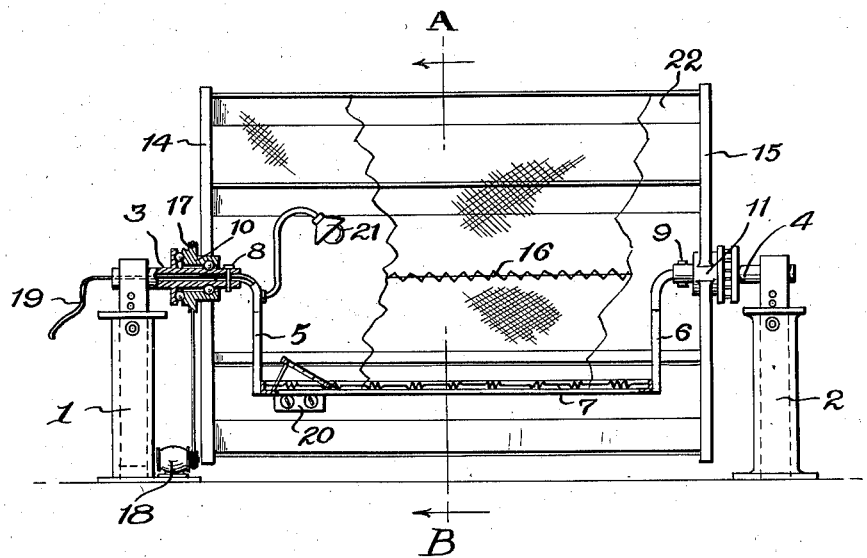
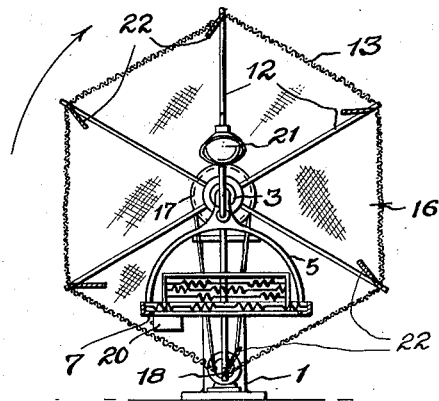
Inventor:
J. Beyschowetz
By: Glascock Downing & Seebold
Attorney Patented Oct. 20, 1936

2,058,053

UNITED STATES PATENT OFFICE 2,058,053

MOSQUITOPROOF RETREAT

Josef Beyschowetz, Vienna, Austria

Application May 7, 1934, Serial No. 724,433
In Austria May 12, 1933

3 Claims. (Cl. 5—362)

This invention relates to improvements in mosquito-proof retreats, and more particularly mosquito-proof beds. It is already known, more particularly for use in sub-tropical and tropical regions, to provide means in conjunction with beds to permit of the draping of mosquito netting tent-fashion over the bedstead for the purpose of keeping off mosquitoes.

It has also been proposed to use a swinging bed suspended from a framework and completely enclosed in a net stretched over a substantially prismatic skeleton frame rigidly attached to the bed.

The present invention provides very considerably improved protection against annoyance by mosquitos, combined with the refreshing effect of air in motion, by the use of a net completely enclosing the couch or bed and adapted to be maintained in rotation about the latter. For this purpose the net is preferably stretched over a prismatic or similarly shaped skeleton framework.

The arrangement can with advantage be such that the stationary couch or bed proper is suspended from arms which take the form of trunnions on which bearings are provided for the framework carrying the mosquito netting, suitable driving means, such as an electromotor, being provided to rotate the drum-shaped net.

This arrangement offers the advantages in the first place of setting up a refreshing movement of the air, which is particularly appreciated in hot climates, by exerting a fanning action, while at the same time the couch or bed remains motionless, and in the second place of preventing the mosquitos from coming near the net at all, so that the net remains effective as a protection even if it should happen to be damaged or defective in parts.

In case no electric current should be available, provision can be made for the drive to be effected in any other manner, for example by means of a water-wheel, a windmill, accumulated mechanical energy, or by human or animal power.

A form of construction embodying the invention is shown by way of example in the accompanying drawing, in which:—

Fig. 1 shows a mosquito-proof bed in accordance with the invention, in side elevation and part section.

Fig. 2 is a transverse section taken on the line A—B of Fig. 1.

In the example shown in the drawing there is provided two uprights 1, 2 which are adjustable as to height, and which are fitted at their upper ends with two supporting arms 3, 4 directed towards each other. These supporting arms are hollow and adapted to be engaged at their inner ends by downwardly bent carriers or suspension members 5, 6 for the couch or bed 7 which are retained in position and prevented from swinging for instance by means of cotter pins 8, 9. On ball bearings on the arms 3, 4 there are rotatably mounted sleeves 10, 11 carrying spoke-like radial arms 12 forming the ends of a drum-shaped framework over which mosquito netting 13 is stretched, and which completely encloses the couch or bed 7. The end portions 14, 15 are also covered with the netting. To provide access to the couch or bed the net 13 is arranged to be opened at any convenient point, for instance by means of a rip or lightning fastener as indicated diagrammatically at 16 in the drawing.

The sleeve 10 is provided with a cord pulley 17 by means of which the net 13 can be set in rotation from an electromotor 18 mounted at the base of the column 1. The current is supplied through a cable 19 to which the motor is connected by conductors which are not shown in the drawing. The cable 19 is passed through the hollow supporting arm 3 to the switches 20 mounted on a bracket attached to the frame of the couch or bed 7, so that the rotation of the net 13 can be started and stopped from the inside. The second of the two switches 20 serves for the switching on and off of a lamp 21.

In consequence of the prismatic shape of the revolving net a lively fanning action is set up which, since it does not produce a draught but a circulatory or eddy movement of the air, is particularly pleasant and refreshing. The fanning action can be still further increased by the provision of fans or flaps 22 inside the net 13 at the the corners thereof. Finally, it is also possible to reduce the number of sides, and to make the net for example quadrilateral instead of hexagonal in cross-section.

As indicated at the outset, the interior of the net can be arranged to serve as a retreat and need not necessarily be occupied by a couch or bed. For this purpose the net can also be made of any required size.

I claim:

1. A mosquito-proof retreat comprising a stand, a lounging member in the form of a bed supported by the said stand, bearing means associated with the said stand, a framework spaced from and completely enclosing the said bed and rotatably mounted on the said bearing means, mosquito netting stretched over the said framework, and means for rotating the said framework and net.

2. A mosquito-proof retreat as claimed in claim 1, in which the said stand comprises two upright supporting columns, a substantially horizontal trunnion attached to each of the said columns, and carrying arms for the said bed engaging the said trunnions.

3. A mosquito-proof retreat as claimed in claim 1 in which the framework is polygonal in cross section, and flap-shaped fan members attached to the inside of the said framework at the corners thereof, for the purpose of increasing the fanning action of the said framework and net.

JOSEF BEYSCHOWETZ.